US009731868B2

(12) United States Patent
Bazbaz

(10) Patent No.: US 9,731,868 B2
(45) Date of Patent: Aug. 15, 2017

(54) POLYMERIC BAGS WITH EASY ACCESS FEATURES ATTACHED TO THE BAGS WITHOUT ADHESIVES

(71) Applicant: Polytex Fibers Corporation, Houston, TX (US)

(72) Inventor: Jacobo Bazbaz, Bellaire, TX (US)

(73) Assignee: Polytex Fibers Corporation, Houston, TX (US)

( * ) Notice: Subject to any disclaimer, the term of this patent is extended or adjusted under 35 U.S.C. 154(b) by 154 days.

(21) Appl. No.: 14/051,965

(22) Filed: Oct. 11, 2013

(65) Prior Publication Data

US 2014/0105523 A1 Apr. 17, 2014

Related U.S. Application Data

(60) Provisional application No. 61/713,323, filed on Oct. 12, 2012.

(51) Int. Cl.
*B65D 33/00* (2006.01)
*B65D 33/16* (2006.01)
(Continued)

(52) U.S. Cl.
CPC .......... *B65D 33/1683* (2013.01); *B32B 5/024* (2013.01); *B32B 27/12* (2013.01);
(Continued)

(58) Field of Classification Search
CPC .... B65D 30/08; B65D 33/25; B65D 33/1683; B65D 33/2583; B65D 29/00; B32B 5/02; B32B 27/12; B32B 27/32; B32B 5/024
(Continued)

(56) References Cited

U.S. PATENT DOCUMENTS 258,925 A 6/1882 Holmes
2,634,896 A 4/1953 Graveno
(Continued)

FOREIGN PATENT DOCUMENTS

CA 2269652 4/2000
EP 1035028 9/2000
(Continued)

OTHER PUBLICATIONS

International Search Report and Written Opinion of the International Searching Authority, International Patent Application No. PCT/US2012/032520, Jul. 16, 2012.
(Continued)

*Primary Examiner* — Peter Helvey
(74) *Attorney, Agent, or Firm* — Vinson & Elkins LLP

(57) ABSTRACT

A woven laminated plastic bag having an easy access or re-sealable feature and methods for making the same are provided. In certain aspects the easy access or re-sealable feature is attached to the bag without the use of an adhesive. In various aspects the bag can be fabricated from woven polypropylene and/or polyethylene layer which can be laminated with a film layer, can form a pinch bottom bag, and can have one or both sides include graphics and/or printing. The bag in one embodiment can also provide a top end and/or a bottom end either or both of which provide one or more discrete areas which may each contain discrete graphics and/or printing.

31 Claims, 11 Drawing Sheets

(51) Int. Cl.
  *B65D 30/00* (2006.01)
  *B32B 5/02* (2006.01)
  *B32B 27/12* (2006.01)
  *B32B 27/32* (2006.01)
  *B65D 33/25* (2006.01)

(52) U.S. Cl.
  CPC .............. *B32B 27/32* (2013.01); *B65D 29/00* (2013.01); *B65D 33/2583* (2013.01)

(58) Field of Classification Search
  USPC .......................... 383/210, 61.2, 61.3, 63, 64
  See application file for complete search history.

(56) References Cited

U.S. PATENT DOCUMENTS

| | | | |
|---|---|---|---|
| 2,991,000 A | 7/1961 | Spees | |
| 3,058,647 A * | 10/1962 | Reiselt | B65D 31/04 383/107 |
| 3,203,620 A * | 8/1965 | Becker | B65D 33/18 383/85 |
| 3,285,498 A | 11/1966 | Becker | |
| 3,508,701 A | 4/1970 | Saito et al. | |
| 3,565,328 A * | 2/1971 | Hudson | B65D 75/68 383/114 |
| 3,648,922 A * | 3/1972 | Gebo | B65D 31/142 383/205 |
| 3,650,460 A * | 3/1972 | Lokey | B65D 31/10 383/109 |
| 3,685,720 A | 8/1972 | Brady | |
| 3,687,356 A * | 8/1972 | Goodrich | B65D 31/10 383/113 |
| 3,990,626 A | 11/1976 | Goodrich | |
| 4,008,850 A | 2/1977 | Goodrich | |
| 4,142,667 A | 3/1979 | Runo | |
| 4,292,332 A | 9/1981 | McHam | |
| 4,373,979 A | 2/1983 | Planeta | |
| 4,441,613 A * | 4/1984 | Hain | B65D 33/20 383/203 |
| 4,460,091 A * | 7/1984 | Hain | B65D 33/30 383/203 |
| 4,480,752 A * | 11/1984 | Jacobs | B65D 31/04 383/123 |
| 4,512,479 A * | 4/1985 | Hain | B65D 75/5855 383/203 |
| 4,515,273 A * | 5/1985 | Jacobson | B31B 19/90 383/205 |
| 4,567,987 A * | 2/1986 | Lepisto | B65D 75/68 383/205 |
| 4,610,651 A | 9/1986 | Jacobson | |
| 4,785,940 A | 11/1988 | Wilson | |
| 4,811,849 A | 3/1989 | Rausing | |
| 4,836,378 A | 6/1989 | Lephardt | |
| 4,955,981 A | 9/1990 | Provost | |
| 5,048,692 A | 9/1991 | Handler et al. | |
| 5,188,235 A | 2/1993 | Pierce et al. | |
| 5,217,307 A | 6/1993 | McClintock | |
| 5,551,781 A | 9/1996 | Wilkes | |
| 5,558,438 A | 9/1996 | Warr | |
| 5,655,843 A | 8/1997 | Conrad | |
| 5,830,543 A | 11/1998 | Miyake et al. | |
| 5,836,697 A | 11/1998 | Chiesa | |
| 5,855,435 A | 1/1999 | Chiesa | |
| 5,902,047 A | 5/1999 | Yeager | |
| 5,908,246 A | 6/1999 | Anmura | |
| 5,938,013 A | 8/1999 | Palumbo | |
| 5,979,655 A | 11/1999 | Tseng et al. | |
| 6,013,018 A | 1/2000 | Bannister | |
| 6,047,883 A | 4/2000 | Calvert et al. | |
| 6,074,095 A | 6/2000 | Bannister | |
| 6,126,316 A | 10/2000 | Bannister | |
| 6,126,317 A | 10/2000 | Anderson | |
| 6,224,262 B1 | 5/2001 | Hogan et al. | |
| 6,241,390 B1 * | 6/2001 | Schneck | B65D 75/58 383/203 |
| 6,315,448 B1 * | 11/2001 | Thrall | B65D 31/02 383/109 |
| 6,328,472 B1 | 12/2001 | Laurence | |
| 6,334,711 B1 | 1/2002 | Risgalla | |
| 6,367,976 B1 * | 4/2002 | Bannister | B65D 31/10 383/109 |
| 6,478,465 B1 | 11/2002 | Thrall | |
| 6,635,711 B1 | 10/2003 | Miskovic et al. | |
| 6,698,928 B2 | 3/2004 | Miller | |
| 6,800,051 B2 | 10/2004 | Koehn | |
| 6,966,134 B2 | 11/2005 | Ngan | |
| 6,979,482 B2 | 12/2005 | Hartzell | |
| 7,090,904 B2 | 8/2006 | Hartzell | |
| 7,165,887 B2 | 1/2007 | Strand et al. | |
| 7,237,953 B2 | 7/2007 | Healy | |
| 7,311,442 B1 | 12/2007 | Moravek | |
| 7,523,825 B2 | 4/2009 | Velazquez | |
| 7,563,027 B2 * | 7/2009 | Allen | B31B 19/90 383/109 |
| 7,722,255 B2 | 5/2010 | Tessera Chiesa | |
| 7,731,425 B2 | 6/2010 | Lin et al. | |
| 8,173,233 B2 | 5/2012 | Rogers | |
| 8,227,062 B2 | 7/2012 | Nowak | |
| 8,240,915 B2 | 8/2012 | Sargin | |
| 8,241,193 B2 | 8/2012 | Jansen | |
| 8,297,840 B2 * | 10/2012 | Jansen | B65D 33/22 383/117 |
| 8,443,578 B2 | 5/2013 | Sargin | |
| 8,475,046 B2 | 7/2013 | Jansen | |
| 8,535,209 B2 | 9/2013 | Sargin | |
| 8,540,427 B2 * | 9/2013 | Steele | B65D 31/10 383/120 |
| 9,073,281 B2 | 7/2015 | Sargin | |
| 9,233,502 B2 | 1/2016 | Sargin | |
| 2003/0040411 A1 | 2/2003 | Albright | |
| 2003/0139516 A1 | 7/2003 | Quinn et al. | |
| 2003/0152299 A1 | 8/2003 | Culbertson et al. | |
| 2003/0228077 A1 | 12/2003 | Laske | |
| 2004/0091648 A1 | 5/2004 | Hartzell et al. | |
| 2005/0087542 A1 | 4/2005 | Bazbaz | |
| 2005/0226542 A1 | 10/2005 | Kendrall et al. | |
| 2006/0045392 A1 | 3/2006 | Bannister | |
| 2006/0072856 A1 | 4/2006 | Su | |
| 2006/0285777 A1 | 12/2006 | Howell | |
| 2006/0285781 A1 | 12/2006 | Zoss | |
| 2007/0042146 A1 * | 2/2007 | Sharp | B32B 27/08 428/35.2 |
| 2007/0047852 A1 | 3/2007 | Sharp et al. | |
| 2007/0047853 A1 | 3/2007 | Sharp et al. | |
| 2007/0104905 A1 | 5/2007 | Floyd | |
| 2007/0140600 A1 | 6/2007 | Nowak | |
| 2007/0292053 A1 | 12/2007 | Lin et al. | |
| 2008/0047228 A1 | 2/2008 | Anzini | |
| 2008/0187695 A1 | 8/2008 | Nowak et al. | |
| 2008/0292223 A1 | 11/2008 | Bannister | |
| 2009/0080813 A1 | 3/2009 | Rasmussen | |
| 2009/0136161 A1 | 5/2009 | Hickey | |
| 2009/0148081 A1 | 6/2009 | Rogers | |
| 2009/0159192 A1 | 6/2009 | Bannister | |
| 2009/0263048 A1 | 10/2009 | Iannelli et al. | |
| 2009/0324143 A1 | 12/2009 | Sharp et al. | |
| 2010/0029455 A1 | 2/2010 | Skopek | |
| 2010/0154362 A1 | 6/2010 | Jansen | |
| 2010/0158417 A1 | 6/2010 | Sharp et al. | |
| 2010/0158418 A1 | 6/2010 | Jansen | |
| 2010/0189380 A1 | 7/2010 | Sargin | |
| 2010/0239796 A1 * | 9/2010 | Gagne | B32B 27/08 428/34.3 |
| 2010/0266223 A1 | 10/2010 | Lin | |
| 2010/0270309 A1 | 10/2010 | Files | |
| 2010/0278454 A1 | 11/2010 | Huffer | |
| 2010/0293897 A1 | 11/2010 | Jansen | |
| 2011/0002560 A1 | 1/2011 | Robles | |
| 2011/0019944 A1 | 1/2011 | Sargin | |
| 2011/0038569 A1 | 2/2011 | Huffer | |
| 2011/0082019 A1 | 4/2011 | Bannister | |
| 2011/0103721 A1 | 5/2011 | Sargin | |
| 2011/0147383 A1 | 6/2011 | Soudais | |
| 2011/0255807 A1 | 10/2011 | Shapiro | |

(56) References Cited

U.S. PATENT DOCUMENTS

| | | |
|---|---|---|
| 2011/0263400 A1 | 10/2011 | Sargin |
| 2012/0314979 A1 | 12/2012 | Heininga |
| 2012/0321229 A1 | 12/2012 | Surdziel |
| 2013/0016926 A1 | 1/2013 | Koehn |
| 2013/0047555 A1 | 2/2013 | Jansen |
| 2013/0206631 A1 | 8/2013 | Bazbaz |
| 2013/0209002 A1 | 8/2013 | Bazbaz |
| 2013/0330028 A1 | 12/2013 | Bannister |
| 2014/0090339 A1 | 4/2014 | Sargin |
| 2015/0183194 A1 | 7/2015 | Lehamnn |

FOREIGN PATENT DOCUMENTS

| | | |
|---|---|---|
| EP | 1035028 A1 | 9/2000 |
| EP | 1035028 B1 | 12/2002 |
| EP | 1468931 A1 | 10/2004 |
| EP | 1780136 | 5/2007 |
| EP | 1780136 A1 | 5/2007 |
| EP | 2263949 | 12/2010 |
| EP | 2599617 | 6/2013 |
| WO | WO 99/61344 A1 | 12/1999 |
| WO | WO 2005/030600 A1 | 4/2005 |
| WO | 2008146142 | 12/2008 |
| WO | 2008157681 | 12/2008 |
| WO | WO 2009/016644 A1 | 2/2009 |
| WO | 2009082712 | 7/2009 |
| WO | WO 2010/093501 A1 | 8/2010 |
| WO | WO 2012/040097 A2 | 3/2012 |
| WO | WO 2012/141981 A1 | 10/2012 |
| WO | WO 2013/123015 A1 | 8/2013 |
| WO | 2015103103 | 7/2015 |

OTHER PUBLICATIONS

International Search Report and Written Opinion of the International Searching Authority, International Patent Application No. PCT/US2013/025891, Apr. 29, 2013.
International Search Report and Written Opinion of the International Searching Authority, International Patent Application No. PCT/US2013/064555, Jan. 3, 2014.
Co-Pending U.S. Appl. No. 13/372,211, filed Feb. 13, 2012.
Co-Pending U.S. Appl. No. 13/441,358, filed Apr. 6, 2012.
Co-Pending U.S. Appl. No. 13/682,289, filed Nov. 20, 2012.
Co-Pending U.S. Appl. No. 14/085,094, filed Nov. 20, 2013.
Co-Pending U.S. Appl. No. 61/755,322, filed Jan. 22, 2013.
Co-Pending U.S. Appl. No. 61/755,326, filed Jan. 22, 2013.

* cited by examiner

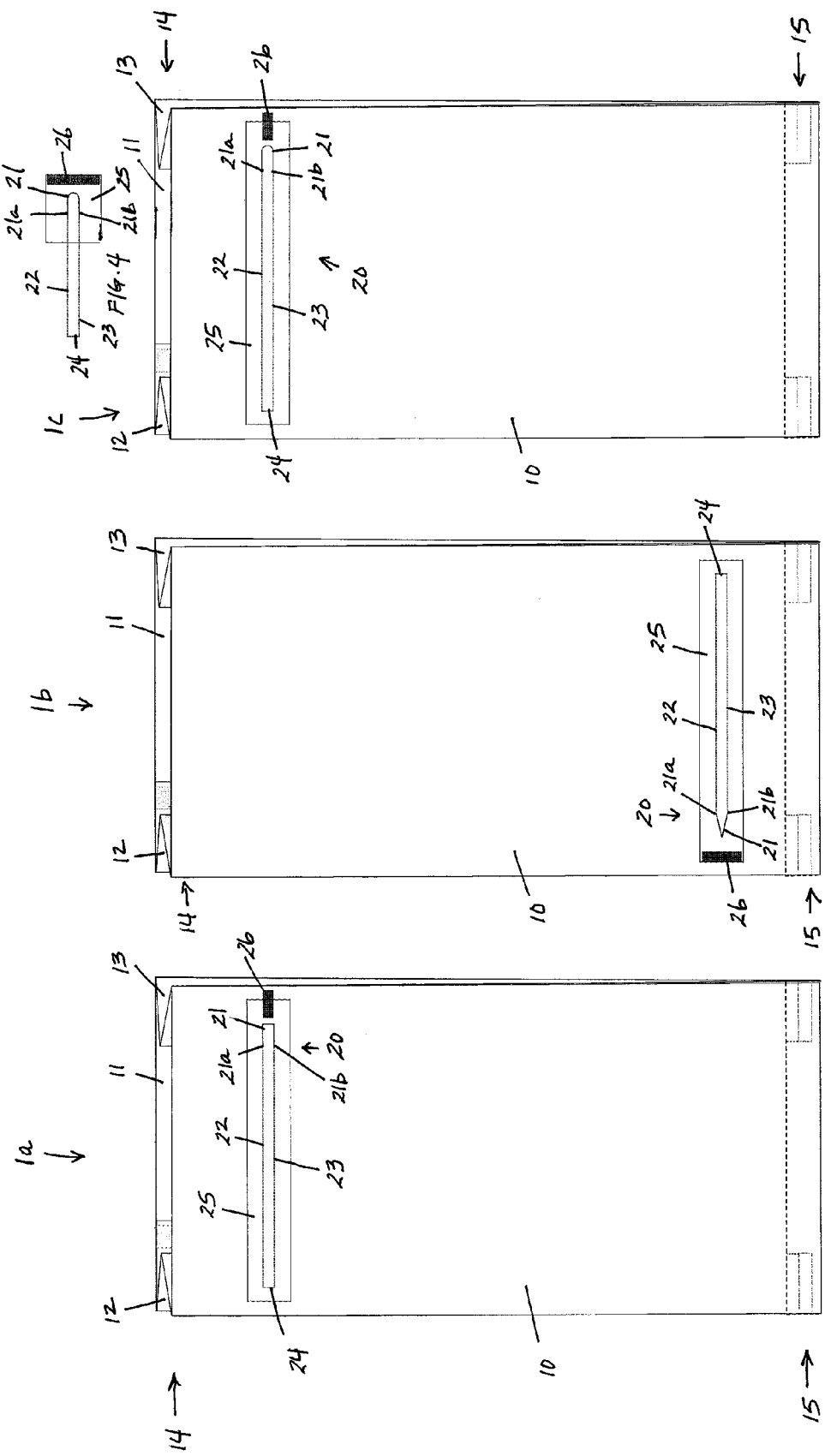

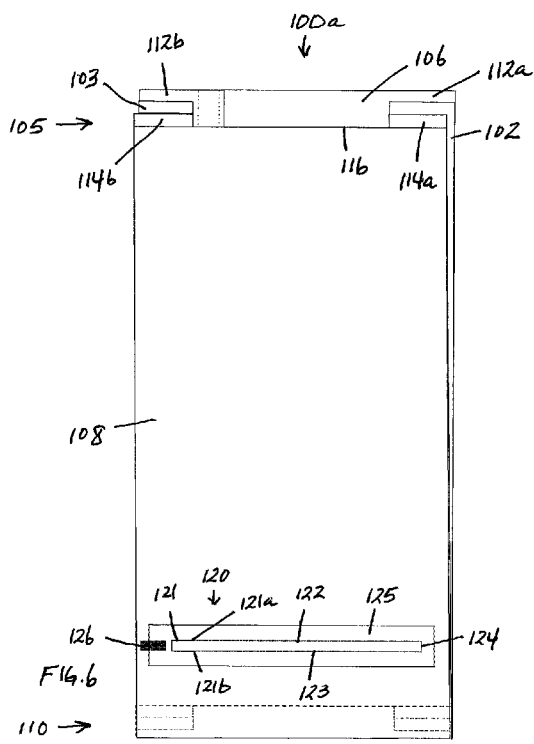
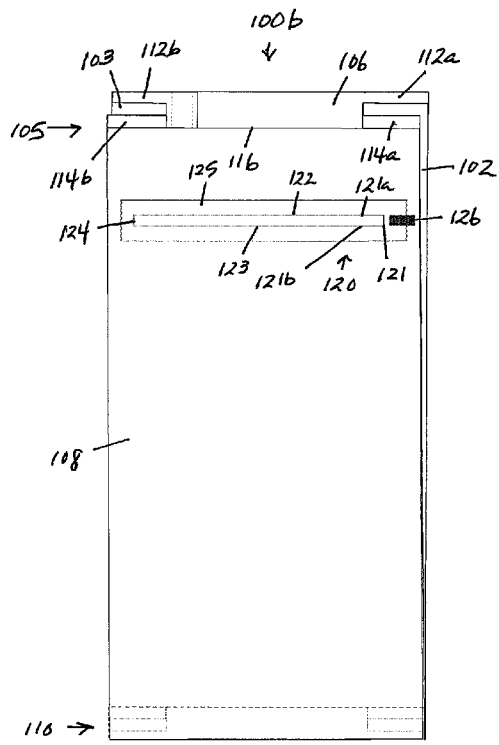
FIG. 7
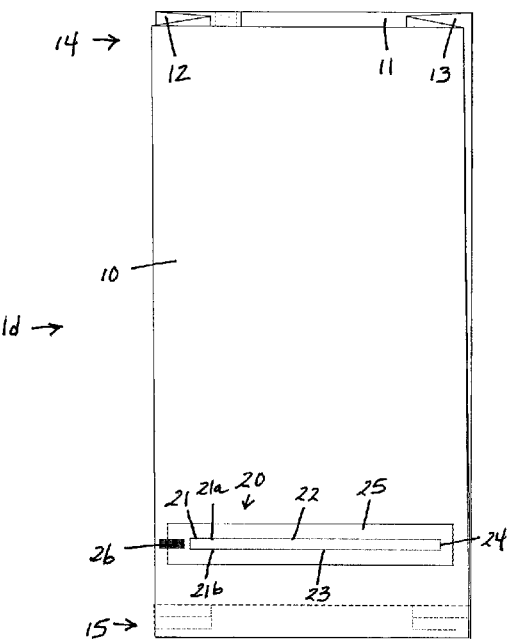
FIG. 5

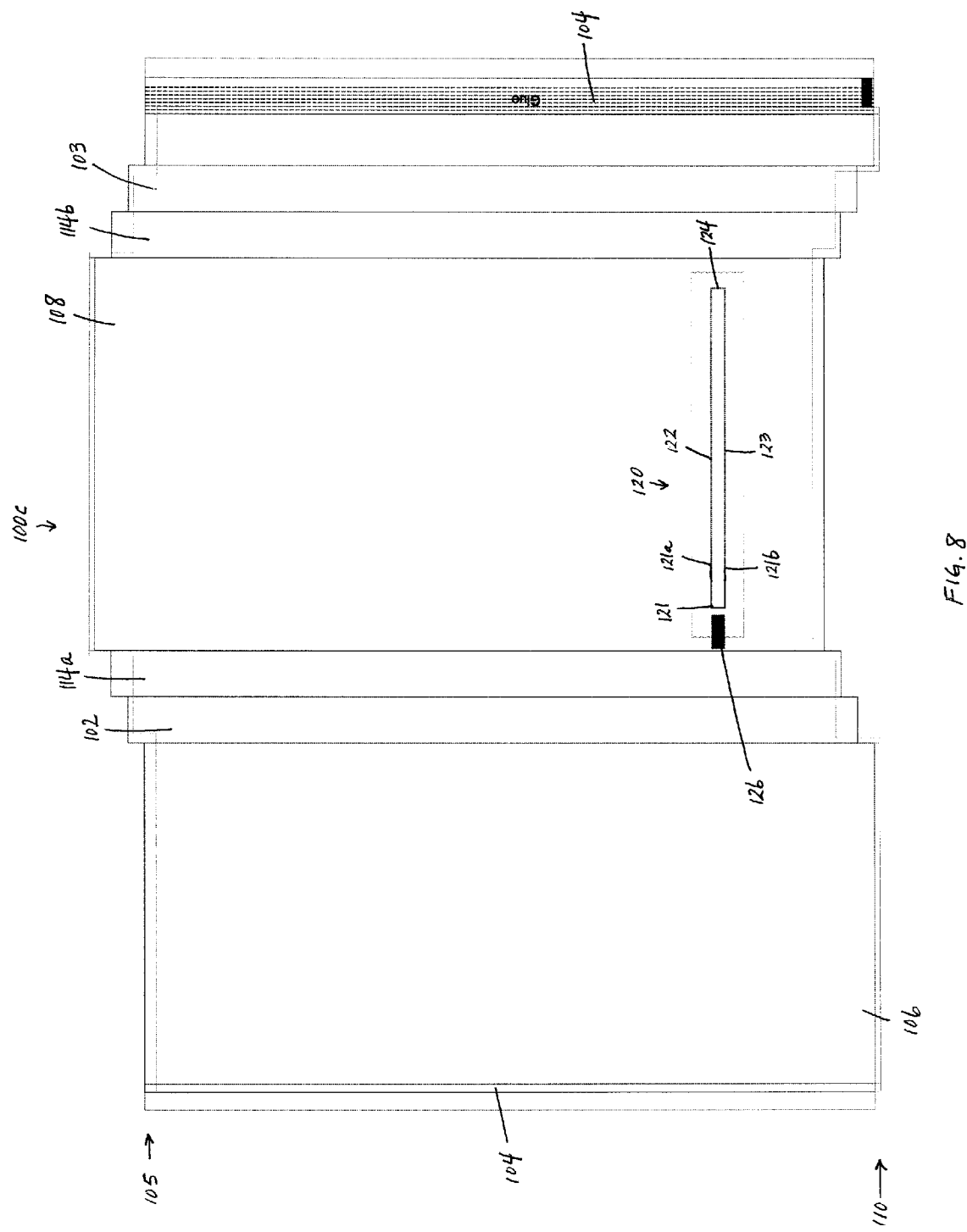

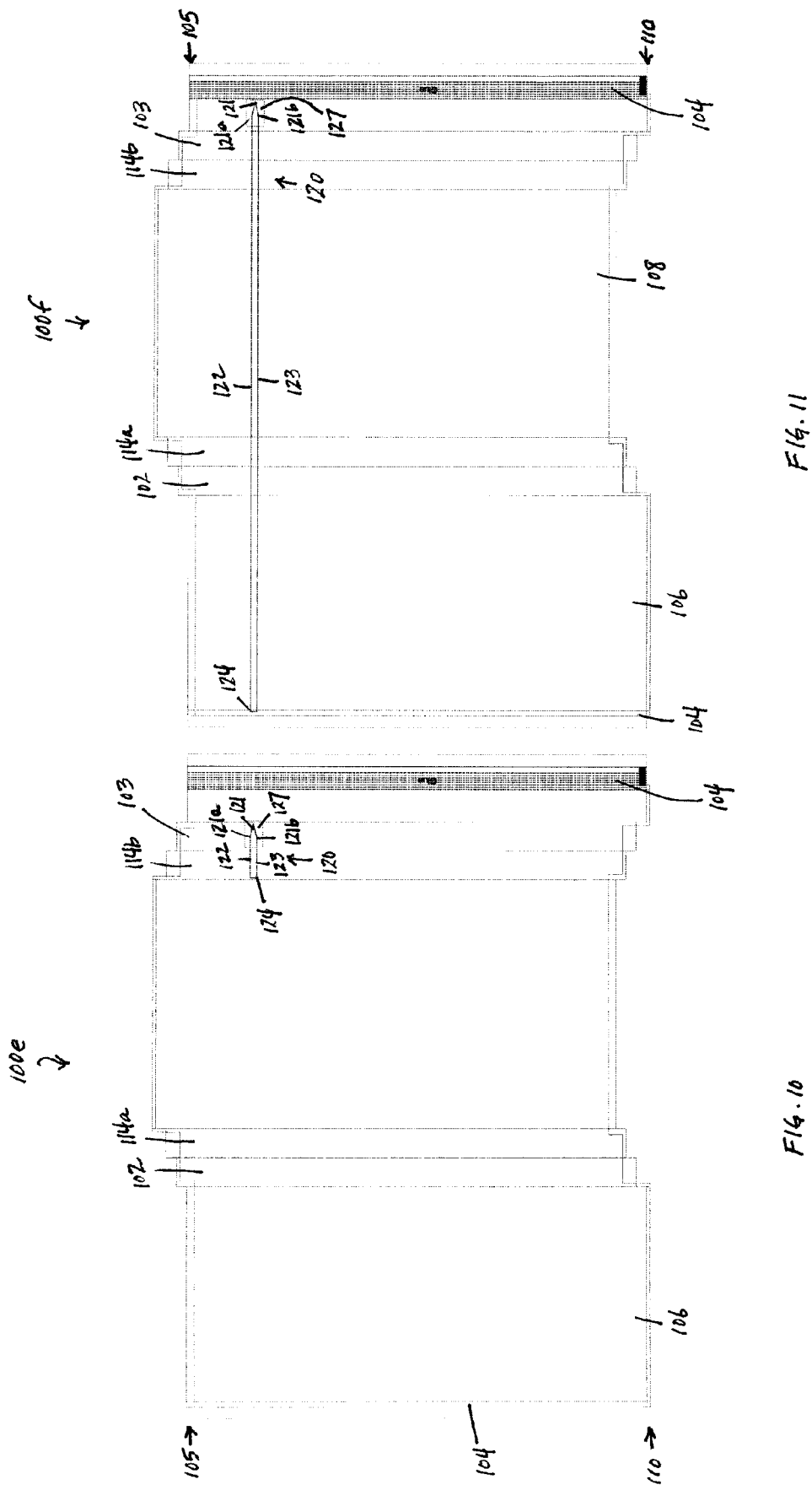

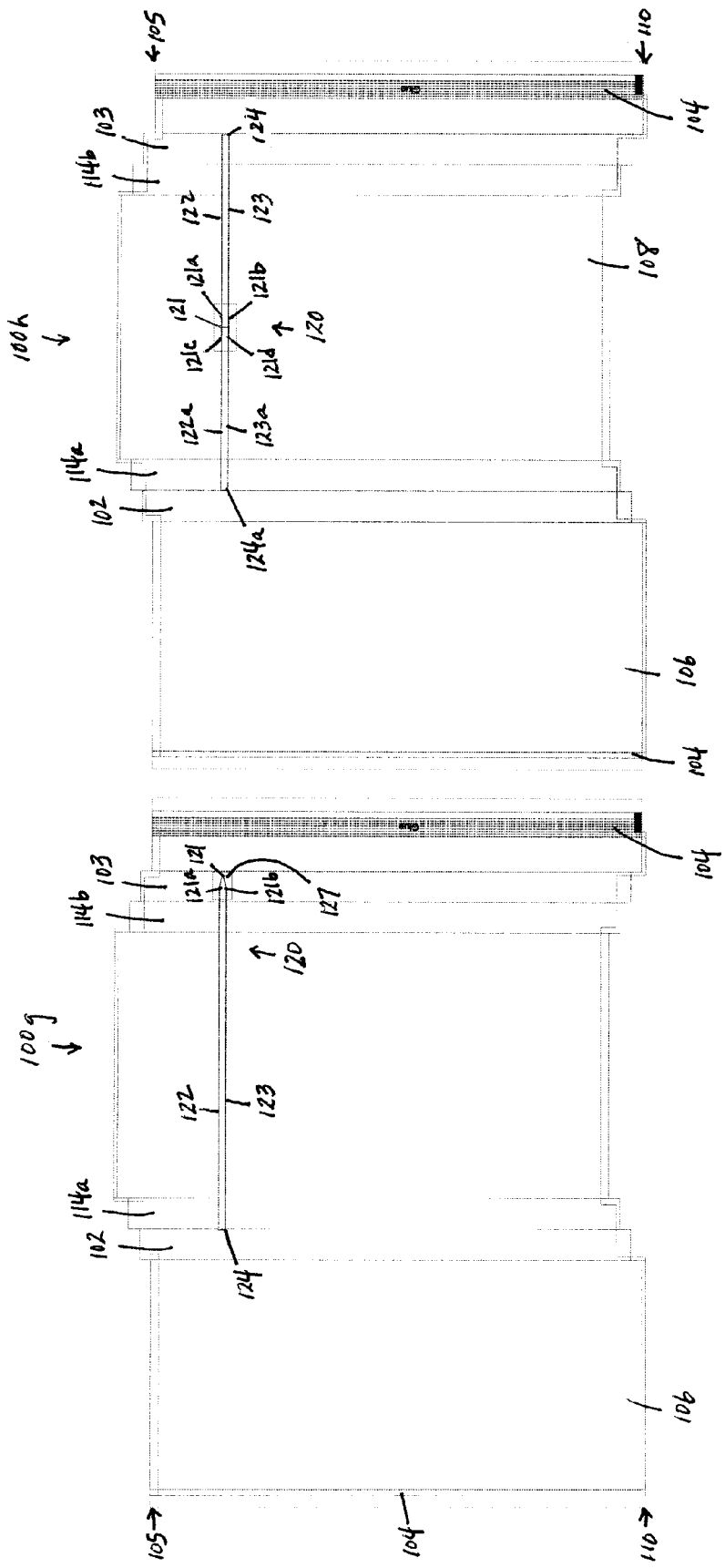

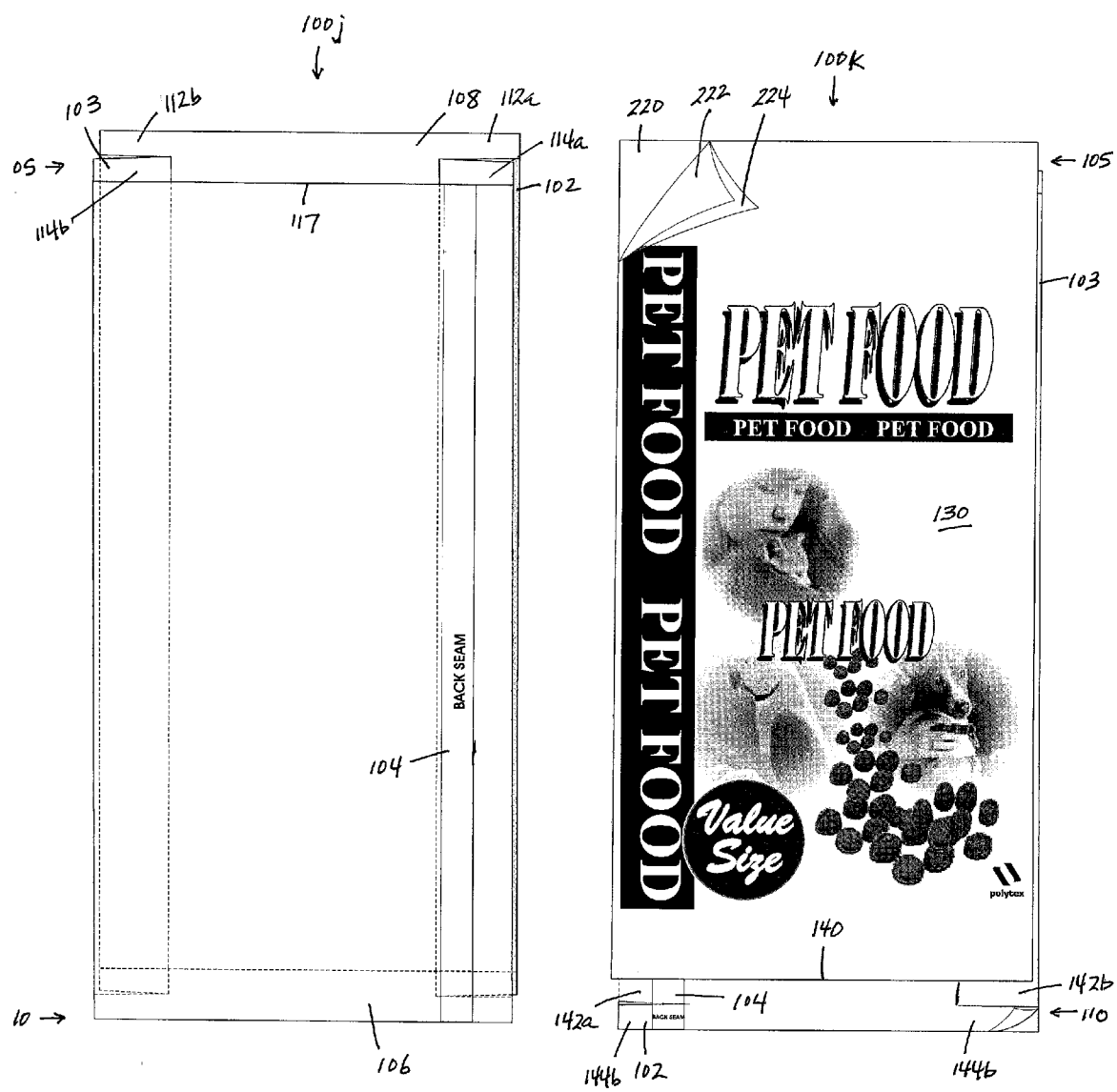

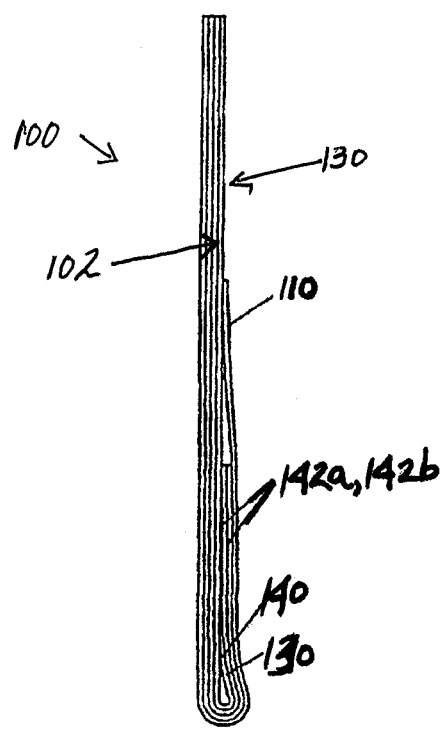

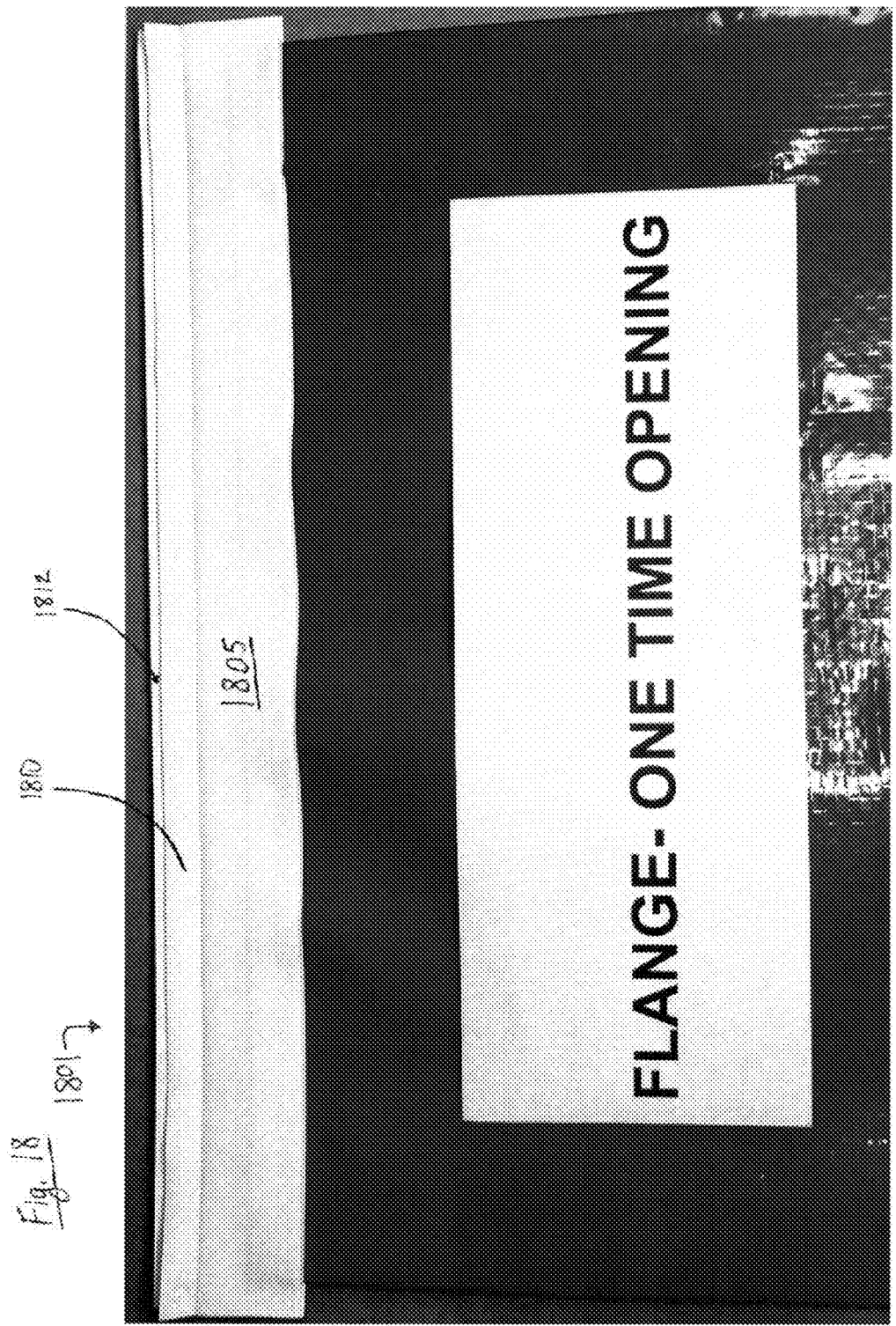

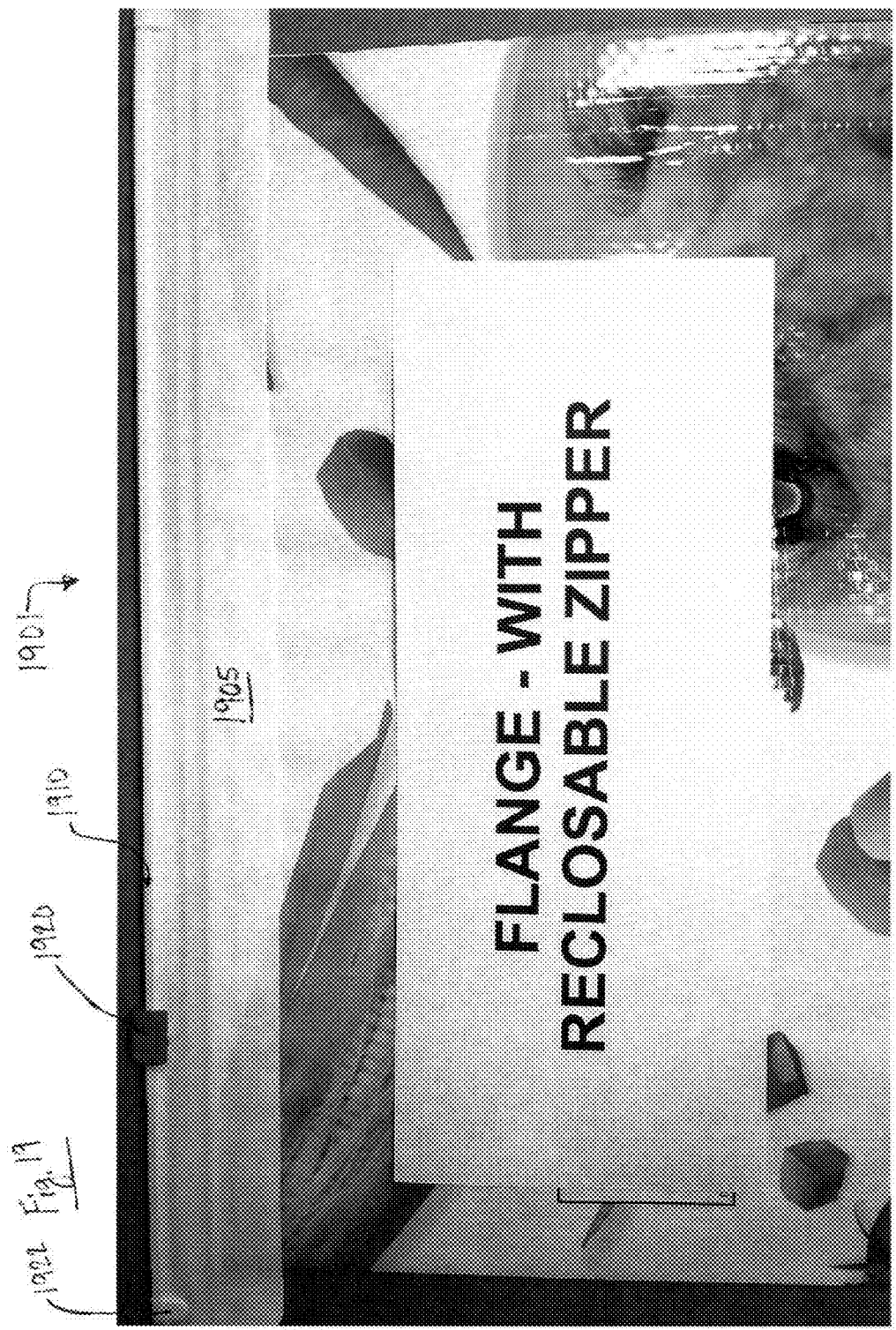

POLYMERIC BAGS WITH EASY ACCESS FEATURES ATTACHED TO THE BAGS WITHOUT ADHESIVES

CROSS-REFERENCE TO RELATED APPLICATIONS

This application claims the benefit of U.S. Provisional Patent Application Ser. No. 61/713,323, filed on Oct. 12, 2012, which is incorporated herein by reference in its entirety.

STATEMENT REGARDING FEDERALLY SPONSORED RESEARCH OR DEVELOPMENT

N/A

THE NAMES OF PARTIES TO A JOINT RESEARCH AGREEMENT

N/A

INCORPORATION-BY-REFERENCE OF MATERIAL SUBMITTED ON A COMPACT DISC

N/A

BACKGROUND OF THE INVENTION

1. Field of the Invention

The present disclosure relates to plastic bags with improved opening features.

2. Background of the Invention

Conventional plastic bags of a wide variety of size and shape are used in various situations. Bulk materials, such as flour, sugar, rice, seed, animal feed, chemicals, powdered materials or the like, for example, typically have been packaged in woven plastic bags in the past. Pet food, bird seed and other products sold in retail stores typically have not been packaged in conventional woven plastic bags. Among other reasons for this, woven plastic bags were considered too rudimentary to be printed with high end graphics suitable for consumer type of packaging. In addition, the high speed requirements in the filling and packaging operations limited the use of the woven bags in these applications.

Laminated woven sacks (LWS) were developed using a woven polypropylene structure laminated to a bi-oriented polypropylene film (BOPP) that can be reverse printed with high end graphics suitable for consumer type of packaging. The LWS provides a stronger, more attractive bag than the more conventional multiwall bags used for that purpose over the last 20 years. Due to their tough strong structure, conventional LWS bags are typically sewn shut on both ends. These LWS recently met with success and have been successfully substituted for the conventional multiwall paper bags used in the pet food industry for many years.

One major drawback of the sewn LWS has been the closing of the bags at high speed filling lines, such as those for filling such bags with pet food. Experience has shown that sewing production lines are typically slower than the filling of the multiwall pinch bottom bags. Additionally, the sewn bags do not provide an aesthetically pleasing and useful clean display on the ends of the bags, thus making it difficult for consumers to identify or find a desired brand quickly when the bags are displayed on the shelves at the point of sale, such as when they are stacked on top of one another. In addition, the sewn ends required puncturing the plastic bags and thus result in a bag that is not sealed, leading to somewhat reduced shelf-life and possible infestation of the contents of the bag. Thus, there is a need for pinch laminated woven sacks that overcome these drawbacks in the filling and closing operations while allowing an attractive graphic display of the bags' ends at the retail outlet and also providing a strong, durable bag which remains sealed.

One major disadvantage of the newly developed pinch bottom laminated woven sack, however, is that it does not include an easy open feature that allows the consumer or purchaser to quickly and easily open the bag without the use of scissors or knives. There is a need for such a pinch bottom laminated woven sack which is easy to open without the use of scissors, knives or other such instruments, and also does not require the use of excessive force.

Woven plastic bags have been used and are conventional for certain applications. An example of a conventional woven plastic bag is provided in U.S. Pat. No. 4,373,979 ("the '979 patent"), issued on Feb. 15, 1983. The '979 patent describes the use of woven strips of highly longitudinally-oriented, high-density polyethylene or polypropylene in a bag construction in which the bag is formed from a seamed tube made of the woven plastic material. The seamed tube has gussets on either side and, when a portion is cut from the rest of the tube, a bag having two open, unsealed ends is provided. The '979 patent describes the use of ultrasonic spot welds to seal portions of a bag made of such woven plastic strips, as opposed to sewing the seams of a bag or using a hot melt adhesive to seal the gusset forming pleat. The '979 patent is hereby incorporated by reference herein.

The '979 patent purports to be an improvement for sealing a plastic bag. As noted in the '979 patent, sewing one end tends to take longer, thus adding time to the manufacturing process. In addition, the sewn ends in a conventional bag tend to be a weak portion of the bag, and a likely location for rips, tearing, and subsequent loss of contents during storing, shipping and handling. In addition, such bags may not provide sufficient protection from infestation from vermin and/or insects.

Another example of plastic bags is disclosed in U.S. Patent Application Publication Number US 2010/0029455 A1 ("the '455 publication"), published on Feb. 4, 2010, which describes production of web sections from a flexible web material that is provided with tear-off lines produced by laser beam processing at the distance of the length of the web sections to be formed. The tear-off lines weaken the flexible web material, but do not result in complete separation of the web sections from the web material, which occurs upon tearing the flexible web material. The '455 publication is incorporated by reference herein.

More recently, some types of plastic bags have provided improvements in sealing the ends of the bags. For example, in U.S. Pat. No. 6,800,051 B2 ("the '051 patent"), issued on Oct. 5, 2004, a process for sealing side fold sacks made of plastic film is described. According to the '051 patent, a web of plastic tubular film is cut to provide a staggered detachment along a perforation so that one wall (e.g., the front wall) projects beyond the opposing wall (e.g., the back wall). The projecting portion of the first wall is then folded over and sealed to the opposing wall by means of a plastic adhesive such as a polyurethane adhesive or hot melt. The '051 patent is hereby incorporated by reference herein. However, such bags involve plastic films, not woven plastic materials, and therefore are unable to handle the weight loads of conventional bulk bags made of paper and other materials. Such bags are useful for only certain lightweight contents, such as bread.

There are a variety of conventional ways of providing for reusable openings in bags. For example, U.S. Pat. No. 6,478,465 B1 ("the '465 patent"), issued Nov. 12, 2002, describes a peelable opening in a multiwall, pinched bottom open mouth bag construction. The '465 patent also describes the use of an adhesive layer that can be used so that the bag opening is reclosable. The '465 patent is hereby incorporated by reference herein.

In other types of conventional plastic bags, such as those used in retail and grocery stores, the use of weakened portion provided by one or more perforations in the plastic bag wall is known. A number of approaches have been taken in connection with such bags, including those shown in U.S. Pat. No. 5,188,235 (the '235 patent), issued Feb. 23, 1993, as well as in U.S. Published Patent Application No. 2005/0087542 A1 (the '542 application), published Apr. 28, 2005, U.S. Pat. No. 5,979,655 (the '655 patent), issued Nov. 9, 1999, and U.S. Published Patent Application No. 2006/0072856 (the '856 application), issued Apr. 6, 2006. However, none of these bags are woven bags, let alone bags with multiple layers. The '235 patent, the '655 patent, the '542 application, and the '856 application are hereby incorporated by reference.

Some conventional woven laminated sacks have included re-sealable features, such as a re-sealable plastic seal including a sliding member which acts like a "zipper" between two plastic flanges. Some conventional woven laminated sacks have included similar features in an attempt to provide an easy open feature which may not be re-sealable. However, such conventional sacks typically require adhesives or hot melts or the like to secure the re-sealable or easy open features to the rest of the LWS. Such approaches add cost and additional manufacturing time and also do not necessarily provide a stable seal between the re-sealable or easy open feature and the remainder of the LWS. Moreover, the adhesives and hot melt approaches may involve the use of chemicals that may be toxic or otherwise compromise the taste, smell and/or quality of the contents of the LWS bag once it is filled. For example, using a hot melt adhesive to seal an end of a bag that is then opened and re-sealed after some of the contents of the bag are withdrawn, perhaps multiple times, may result in contamination of the contents of the bag by materials and contents of the hot melt adhesive or adhesives used. Such a seal from hot melt or other adhesives is considered undesirable.

Some woven and non-woven bags are sealed with a single or double fold at each end with tape over the single or double fold, stitching at both ends, or a zipper at one end and a single or double fold at the other end. However, opening woven and certain non-woven bags has proven difficult, due to the strength of the bag. Therefore, what is needed are woven and non-woven bags that are easier to open, that are re-sealable, that do not add much to the cost or time to manufacture, and are not susceptible to inadvertent tearing, punctures, breaking, or the like.

SUMMARY OF THE INVENTION

The present disclosure provides woven and non-woven polymeric or plastic bags comprising an easy access or re-sealable feature, which makes the presently disclosed woven and non-woven polymeric bags easier to open than conventional woven and non-woven polymeric bags. In addition, the presently disclosed easy access or re-sealable features are attached to the woven and non-woven polymeric bags without the use of adhesives, thereby forming a plastic-to-plastic seal.

The present disclosure provides a bag comprising a front wall, a back wall, an interior surface, an exterior surface, a top end, a bottom end, a first layer and a second layer, each of the front wall and back wall having an interior surface, an exterior surface, a top end and a bottom end, wherein the first layer comprises a polymer and the second layer comprises a polymer attached to the first layer, and wherein the bag comprises an easy open feature located on the front wall of the bag, the back wall of the bag, or a combination thereof. The first layer can comprise a woven polymer, including, but not limited to, polypropylene, high density polyethylene, low density polyethylene, polyester, or any combination thereof. The second layer can comprise a polymeric film, including, but not limited to, polypropylene, polyethylene, polyethylene terephthalate, polyamide, or any combination thereof, or paper or coated paper portion suitable for having high quality print graphics thereon, or a combination of a polymeric film and a paper portion suitable for having high quality print graphics thereon. The second layer can alternatively comprise an oriented polymeric film, including, but not limited to, oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, or any combination thereof. The first layer and second layer can be laminated together. Thus in certain aspects the first layer can consist or consist essentially of a woven polymer and the second layer can consist or consist essentially of a film.

In one embodiment the easy open or re-sealable feature comprises a pair of flanges which together form a groove into which another member can be removably secured so that two opposing flaps can be easily joined together or separated manually by a user without tools. The feature may comprise a "zipper" structure with a movable member sealing or unsealing the LWS as it is moved along a groove or may consist of one or more flanges that removably fit together. In one embodiment, the easy open or re-sealable feature includes a material comprising polyethylene, polypropylene, polyester, a co-polymer of one or more of the foregoing, or other polymer, and at least a portion of the outer surface of the LWS includes a material comprising the same polymer or co-polymer as the easy open or re-sealable feature. In another embodiment, at least a portion of the easy open or re-sealable feature is secured to a portion of the outer surface of the LWS by a sealed connection formed without the use of an adhesive, for example by placing the easy open or re-sealable feature in a selected location relative to the LWS, providing hot air or another gas within a selected temperature range and for a selected time period to at least one area so as to seal at least a portion of the easy open feature or re-sealable feature to at least a portion of the outer surface of the LWS. Alternatively, the sealed connection may be formed by applying pressure to and heating a selected location, applying ultrasound to a selected location, or applying radiowaves to a selected location, to assist in forming a seal between the outer surface of the LWS and the easy open or re-sealable feature. In still another embodiment, the seal between the outer surface of the LWS and the easy open or re-sealable feature extends for the entire length of one end of the LWS so as to seal that end of the LWS until such time as a user opens the LWS using the easy open or re-sealable feature.

In certain embodiments the bottom end of the bag is sealed using conventional means. For example, at least a portion of a single fold of the bottom end of the front wall and the rear wall of the bag can be sealed to the outer surface of the front wall or rear wall of the bag, using an adhesive sealing, heat sealing, adhesive lamination, extrusion lamination, stitching, ultrasonic energy, pressure, tape, or any combination thereof. Alternatively at least a portion of a double fold of the bottom end of the front wall and the rear wall of the bag can be sealed to the outer surface of the front wall or rear wall of the bag. However, in certain aspects at least a portion of the bottom end of the rear wall, or the entire bottom end of the rear wall, projects further than the bottom end of the front wall. Thus, the portion of the bottom end of the rear wall that projects further than the bottom end of the front wall can be sealed to the outer surface of the bottom end of the front wall. Additionally, the top end of the bag can be sealed using conventional means. For example, at least a portion of a single fold of the top end of the front wall and the rear wall of the bag can be sealed to the outer surface of the front wall or rear wall of the bag, using an adhesive sealing, heat sealing, adhesive lamination, extrusion lamination, stitching, ultrasonic energy, pressure, tape, or any combination thereof. Alternatively at least a portion of a double fold of the top end of the front wall and the rear wall of the bag can be sealed to the outer surface of the front wall or the rear wall of the bag. However, in certain aspects at least a portion of the top end of the rear wall, or the entire top end of the rear wall, projects further than the top end of the front wall. Thus, the portion of the top end of the rear wall that projects further than the top end of the front wall can be sealed to the outer surface of the bottom end of the front wall. The top end and/or the bottom end of the bag can also comprise stitching therethrough.

In certain embodiments the bag further comprises a first side wall having an interior surface, an exterior surface, a top end and a bottom end, and a second side wall having an interior surface, an exterior surface, a top end and a bottom end. The first side wall and/or the second side wall can comprise gussets. In certain aspects at least a portion of the bottom end of the rear wall projects further than the bottom end of the first side wall, the bottom end of the second side wall, and the bottom end of the front wall. In an exemplary way to seal the bottom end of such bags, the portion of the bottom end of the rear wall that projects further than the bottom end of the first side wall, the bottom end of the second side wall, and the bottom end of the front wall can be sealed to the outer surface of the bottom end of the front wall. In additional aspects at least a portion of the top end of the front wall projects further than the top end of the first side wall, the top end of the second side wall and the top end of the rear wall. In these aspects the portion of the top end of the bag that projects further than the top end of the first side wall, the top end of the second side wall and the top end of the rear wall can be sealed to the outer surface of the top end of the rear wall.

Alternatively a portion of the bottom end of the rear wall can project further than the bottom end of the first side wall and the bottom end of the second side wall, and a portion of the bottom end of the first side wall and the bottom end of the second side wall can project further than the bottom end of the front wall. In an exemplary way to seal the bottom end of such bags, the portion of the bottom end of the rear wall that projects further than the bottom end of the first side wall and the bottom end of the second side wall, and the portion of the bottom end of the first side wall and the bottom end of the second side wall that projects further than the bottom end of the front wall can be sealed to the outer surface of the bottom end of the front wall. In further aspects at least a portion of the top end of the front wall projects further that the top end of the first side wall and the top end of the second side wall, and the top end of the first side wall and the top end of the second side wall project further than the top end of the rear wall. In these aspects the portion of the front wall that projects further than the top end of the first side wall and the top end of the second side wall, and the portion of the top end of the first side wall and the top end of the second side wall that projects further than the top end of the rear wall can be sealed to the outer surface of the top end of the rear wall. In particular embodiments the top end and the bottom end of the bag are sealed, as set forth above, and the bag comprises at least ten pounds by weight of a bulk item. In certain aspects such sealed bags can comprise six printable surfaces.

Additionally the bag can further comprise a third layer comprising a polymer positioned between the first layer and the second layer. The third layer can comprise a woven polymer, including, but not limited to, polypropylene, high density polyethylene, low density polyethylene, polyester, or any combination thereof. The third layer can alternatively comprise a polymeric film, including, but not limited to, polypropylene, polyethylene, polyethylene terephthalate, polyamide, or any combination thereof. The third layer can further comprises an oriented polymeric film, including, but not limited to, oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, or any combination thereof.

The present disclosure additionally provides a bag comprising a front wall, a back wall, a first side wall, a second side wall, an interior surface, an exterior surface, a top end, a bottom end, a first layer and a second layer, the front wall, back wall, first side wall and second side wall having an interior surface, an exterior surface, a top end and a bottom end, wherein the first layer comprises a polymer and the second layer comprises a polymer attached to the first layer, and wherein the bag comprises an easy open feature located on the front wall of the bag, the back wall of the bag, the first side wall of the bag, the second side wall of the bag, or any combination thereof. The easy open or re-sealable feature can be located on the front wall, the back wall, the first side wall, the second side wall, or any combination thereof. The first layer can comprise polypropylene, high density polyethylene, low density polyethylene, polyester, or any combination thereof. The second layer can comprise a polymeric film.

It is an object of the invention to provide a woven plastic bag that is stronger than bags made of plastic films, and yet easier to open than conventional woven bags.

It is another object of the invention to provide a woven plastic bag that includes an easy open feature and still provides strength and durability, reducing the potential for tearing, damage, infestation, and loss of contents.

It is still another object of the invention to provide a woven bag that can be manufactured more quickly and therefore is less costly than conventional bags, and that has an easy open feature that makes opening the woven bag easier than opening conventional woven bags.

It is still another object of the invention to provide a woven polymeric bag that provides an attractive high end graphic display on at least one end of the bags when are displayed or presented at the point of sale.

These and other objects of the invention will be apparent to those skilled in the art from the following detailed description.

BRIEF DESCRIPTION OF THE DRAWINGS

FIG. 1 shows a flush cut bag with an easy open feature comprising a square cut through the bag located near the top end of the bag according to one embodiment of the present disclosure.

FIG. 2 shows a flush cut bag with an easy open feature comprising a carat cut through the bag located near the top end of the bag according to one embodiment of the present disclosure.

FIG. 3 shows a flush cut bag with an easy open feature comprising a semi-circular cut through the bag located near the top end of the bag according to one embodiment of the present disclosure.

FIG. 4 shows a pull tab comprising a promotional coupon according to one embodiment of the present disclosure.

FIG. 5 shows a flush cut bag with an easy open feature comprising a square cut through the bag located near the bottom end of the bag according to one embodiment of the present disclosure.

FIG. 6 shows a pinch cut bag with an easy open feature comprising a square cut through the bag located near the bottom end of the bag according to one embodiment of the present disclosure.

FIG. 7 shows a pinch cut bag with an easy open feature comprising a square cut through the bag located near the top end of the bag according to one embodiment of the present disclosure.

FIG. 8 shows an outline of a pinch cut bag with an easy open feature comprising a square cut through the bag located near the bottom end of the front panel of the bag according to one embodiment of the present disclosure.

FIG. 10 shows an outline of a pinch cut bag with an easy open feature comprising a carat cut through the bag located near the top end of a side panel of the bag and extending through the side panel according to one embodiment of the present disclosure.

FIG. 11 shows an outline of a pinch cut bag with an easy open feature comprising a carat cut through the bag located near the top end of a side panel of the bag and extending across the entire length of the bag according to one embodiment of the present disclosure.

FIG. 12 shows an outline of a pinch cut bag with an easy open feature comprising a carat cut through the bag located near the top end of a side panel of the bag and extending across the side panel and the front panel of the bag according to one embodiment of the present disclosure.

FIG. 13 shows an outline of a pinch cut bag with an easy open feature comprising a bidirectional square cut through the bag located near the top end of the front panel of the bag and extending into both side panels according to one embodiment of the present disclosure.

FIG. 14 shows a back side view of a pinch cut bag according to one embodiment of the present disclosure.

FIG. 15 shows a front side view of a printed pinch cut bag with an easy open feature comprising a square cut through the bag located near the top end of the bag according to one embodiment of the present disclosure.

FIG. 16 shows a cross-sectional view of a top end or bottom end portion of a pinch cut bag according to one embodiment of the present disclosure.

FIG. 18 shows an embodiment with an easy open feature at one end of a bag.

FIG. 19 shows another embodiment with an easy open feature.

DETAILED DESCRIPTION OF THE PREFERRED EMBODIMENT

Figure 9:
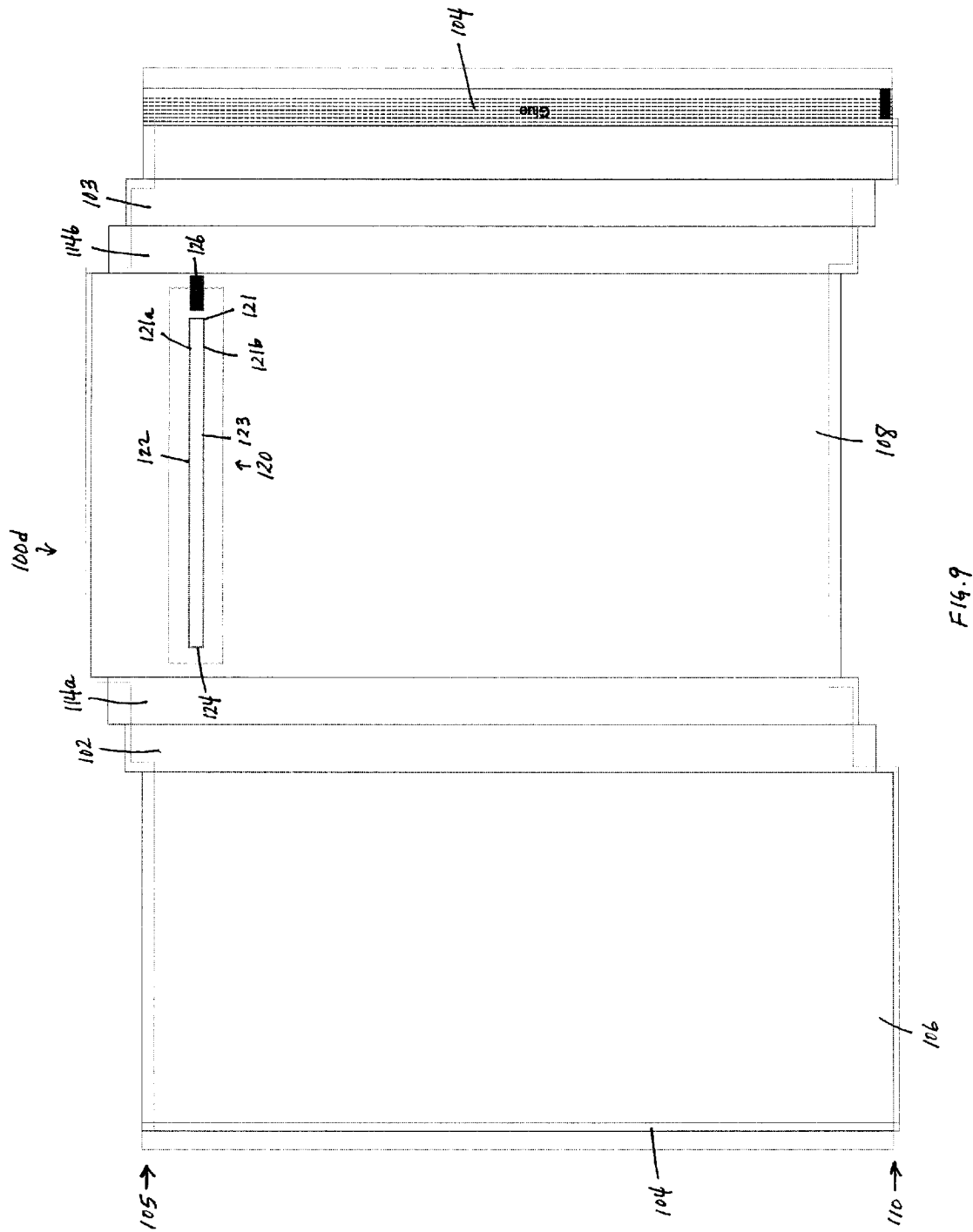
FIG. 9 shows an outline of a pinch cut bag with an easy open feature comprising a square cut through the bag located near the top end of the front panel of the bag according to one embodiment of the present disclosure.

Referring first to FIG. 1, the front side view of an embodiment of a "flush cut" bag 1a is shown. Bag 1a has a front wall 10, a back wall 11, a first side wall 12, a second side wall 13, a top end 14, and a bottom end 15. It will be apparent, however, that the orientation of the bag ends 14 and 15 is unimportant and the "top" and "bottom," as well as "front" and "back," references are useful but may change depending on the orientation one views the bag. Bag 1a is considered a "flush cut" bag because the front wall 10 and the back wall 11 are cut so that the ends of the front wall 10 and the back wall 11 are essentially "flush" with one another; they have substantially the same length. Bag 1a also comprises an easy open feature 20 near the top end 14 of the bag 1a, which in this embodiment comprises a full cut 21 in a rectangular shape having a first end 21a and a second end 21b through the front wall 10 of bag 1a, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, tape 25 covering the cut and the rows of perforations, and a pull tab 26 attached to the tape 25. Although in this embodiment the easy open feature 20 is located near the top end 14 of the bag 1a and the pull tab is located close to the second side wall 13, the skilled artisan will realize that the easy open feature 20 could also be in the opposite orientation, with the pull tab located closer to the first side wall 12, reside in either orientation near the bottom end 15 of the front wall 10 of bag 1a, or reside in either orientation near the top end 14 or bottom end 15 on the back wall 11 of the bag 1a. The full cut 21 can be formed by punching, cutting, or through the use of a laser, or by any other technique known to those skilled in the art. The easy open feature 20 (in this embodiment the cut 21 and/or first 22 or second 23 row of perforations) provides a portion of bag 1a that is weakened. This weakened portion can be opened with less force than required to open or tear other portions of the bag 1a.

Bag 1a can be opened by pulling the pull tab 26, which removes the tape 25 and the portion of bag 1a defined by the cut 21 and the first, second, and third row of perforations 22, 23, and 24, respectively. Although not shown in this embodiment, it will be understood that the full cut 21 can be larger or smaller, and can extend to a greater or lesser extent, and the first and second rows of perforations 22 and 23, respectfully, can extend any distance from the first end and second end, respectively, of the cut toward the opposite side wall of the bag, for example 50%, 75%, 90% or about 100% of the distance from the ends of the cut to the opposite side of the bag. In addition, although not shown in this embodiment, the tape 25 can cover less than the full extent of the first and second rows of perforations, whatever distance the rows of perforations extend across the front wall of the bag, and in certain embodiments covers only the full cut portion of the easy open feature 20. Additionally, the pull tab 26 can comprise black and white and/or color printing (not shown), for example a coupon (not shown), and can also be used to reclose the bag.

Referring to FIG. 2, the front side view of another embodiment of a flush cut bag 1b is shown. Bag 1b also has a front wall 10, a back wall 11, a first side wall 12, a second side wall 13, a top end 14, and a bottom end 15. Bag 1b also comprises an easy open feature 20, which in this embodiment is near the bottom end 15 of the bag 1b and comprises a full cut 21 in a triangular or carat shape having a first end 21a and a second end 21b through the front wall 10 of bag 1b, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, tape 25 covering the cut and the rows of perforations, and a pull tab 26 attached to the tape 25.

Referring to FIG. 3, the front side view of yet another embodiment of a flush cut bag 1c is shown. Bag 1c also has a front wall 10, a back wall 11, a first side wall 12, a second side wall 13, a top end 14, and a bottom end 15. Bag 1c also comprises an easy open feature 20, which in this embodiment is near the top end 14 of the bag 1c and comprises a full cut 21 in a semi-circular shape having a first end 21a and a second end 21b through the front wall 10 of bag 1c, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, tape 25 covering the cut and the rows of perforations, and a pull tab 26 attached to the tape 25.

Referring to FIG. 4, an alternate embodiment of tape 25 and pull tab 26 is shown, where tape 25 covers the full cut 21 in a semi-circular shape having a first end 21a and a second end 21b, but does not cover the full extent of the first row of perforations 22 and the second row of perforations 23, and does not cover the third row of perforations 24. In this embodiment, the pull tab 26 includes instructions to open the bag, but can also comprise black and white and/or color printing (not shown), for example a promotional coupon (not shown).

Referring to FIG. 5, the front side view of still another embodiment of a flush cut bag 1d is shown. Bag 1d also has a front wall 10, a back wall 11, a first side wall 12, a second side wall 13, a top end 14, and a bottom end 15. Bag 1d also comprises an easy open feature 20, which in this embodiment is near the bottom end 15 of the bag 1d and comprises a full cut 21 in a rectangular shape having a first end 21a and a second end 21b through the front wall 10 of bag 1d, a first row of perforations 22 extending from the first end 21a of the cut 21, a second row of perforations 23 extending from the second end 21b of the cut 21, an optional third row of perforations 24 connecting the end of the first row of perforations 22 and the second row of perforations 23, tape 25 covering the cut and the rows of perforations, and a pull tab 26 attached to the tape 25.

Referring to FIG. 6, the front side view of one embodiment of a "pinch cut" bag 100a is shown. As shown in FIG. 6, the bag 100a has a first or top end 105 and a second or bottom end 110. Once again, it will be apparent, however, that the orientation of the bag ends 105 and 110 is unimportant and the "top" and "bottom" references are useful but may change depending on the orientation one views the bag. Bag 100a is considered a "pinch cut" bag because one of the front wall 108 or the back wall 106 are cut so that one of the ends of the front wall 108 or the back wall 106 is longer than the other; they have different lengths. In the embodiment shown in FIG. 6 both of the ends of the bag 100a have a "pinch cut." The bag 100a has a front wall or surface 108 with top end 116, a rear wall or surface 106, and two side walls 102 and 103. Those skilled in the art will appreciate that conventional techniques can be used to provide side gussets in the bag 100a for each of sides 102 and 103 during this forming process. The first end 105 of bag 100a has portions 112a and 112b of the rear wall or surface 108 of the bag that extend further from the body of the bag 100a than do portions 114a and 114b of the material of bag 100a forming the side gussets for sides 102 and 103. In addition, the portions 114a and 114b of the side gussets extend further from the body of the bag 100a than the top end 116 of the front wall 108 of the bag 100a. As shown in FIG. 6, the front wall 108 of the bag 100a has an end portion 116 at the first end 105 of the bag that does not extend as far from the body of the bag 100a as the end portions 114a and 114b of the side gussets or the end portions 112a and 112b of the rear wall of the first end 105 of the bag 100a. Bag 100a also comprises an easy open feature 120 near the top end 105 of the bag 100a, which in this embodiment comprises a full cut 121 in a rectangular shape having a first end 121a and a second end 121b through the front wall 108 of bag 100a, a first row of perforations 122 extending from the first end 121a of the cut 121, a second row of perforations 123 extending from the second end 121b of the cut 121, an optional third row of perforations 124 connecting the end of the first row of perforations 122 and the second row of perforations 123, tape 125 covering the cut and the rows of perforations, and a pull tab 126 attached to the tape 125.

Referring to FIG. 7, the front side view of another embodiment of a pinch cut bag 100b is shown. As shown in FIG. 7, the bag 100b has a first or top end 105 and a second or bottom end 110. The bag 100b has a front wall or surface 108 with top end 116, a rear wall or surface 106, and two side walls 102 and 103. The first end 105 of bag 100b has portions 112a and 112b of the rear wall or surface 108 of the bag that extend further from the body of the bag 100b than do portions 114a and 114b of the material of bag 100 forming the side gussets for sides 102 and 103. In addition, the portions 114a and 114b of the side gussets extend further from the body of the bag 100b than the top end 116 of the front wall 108 of the bag 100b. As shown in FIG. 7, the front wall 108 of the bag 100b has an end portion 116 at the first end 105 of the bag that does not extend as far from the body of the bag 100b as the end portions 114a and 114b of the side gussets or the end portions 112a and 112b of the rear wall of the first end 105 of the bag 100b. Bag 100b also comprises an easy open feature 120, which in this embodiment is near the bottom end 110 of the bag 100b and comprises a full cut 121 in a rectangular shape having a first end 121a and a second end 121b through the front wall 108 of bag 100b, a first row of perforations 122 extending from the first end 121a of the cut 121, a second row of perforations 123 extending from the second end 121b of the cut 121, an optional third row of perforations 124 connecting the end of the first row of perforations 122 and the second row of perforations 123, tape 125 covering the cut and the rows of perforations, and a pull tab 126 attached to the tape 125.

Referring to FIG. 8, a planar view of an embodiment of a substantially flat sheet of material from which a bag 100c is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the bottom end 110 of the front wall 108 of the bag 100c and comprises a full cut 121 in a rectangular shape having a first end 121a and a second end 121b through the front wall 108 of bag 100c, a first row of perforations 122 extending from the first end 121a of the cut 121 across the front wall 108 of bag 100a, a second row of perforations 123 extending from the second end 121b of the cut 121 across the front wall 108 of bag 100c, an optional third row of perforations 124 connecting the end of the first row of perforations 122 and the second row of perforations 123, tape 125 covering the cut 121 and the rows of perforations, and a pull tab 126 attached to the tape 125.

Referring to FIG. 9, a planar view of another embodiment of a substantially flat sheet of material from which a bag 100d is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the front wall 108 of the bag 100d and comprises a full cut 121 in a rectangular shape having a first end 121a and a second end 121b through the front wall 108 of bag 100d, a first row of perforations 122 extending from the first end 121a of the cut 121 across the front wall 108 of bag 100d, a second row of perforations 123 extending from the second end 121b of the cut 121 across the front wall 108 of bag 100d, an optional third row of perforations 124 connecting the end of the first row of perforations 122 and the second row of perforations 123, tape 125 covering the cut 121 and the rows of perforations, and a pull tab 126 attached to the tape 125.

Referring to FIG. 10, a planar view of another embodiment of a substantially flat sheet of material from which a bag 100e is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the second side 103 of the bag 100e and comprises a full cut 121 in a carat shape having a first end 121a and a second end 121b through the second side 103 of bag 100e, a first row of perforations 122 extending from the first end 121a of the cut 121 across the second side 103 of bag 100e, a second row of perforations 123 extending from the second end 121b of the cut 121 across the second side 103 of bag 100e, an optional third row of perforations 124 connecting the end of the first row of perforations 122 and the second row of perforations 123, and a pull tape 127 covering the cut 121 and a small portion of the first row of perforations 122 and second row of perforations 123.

Referring to FIG. 11, a planar view of another embodiment of a substantially flat sheet of material from which a bag 100f is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the second side 103 of the bag 100f and comprises a full cut 121 in a carat shape having a first end 121a and a second end 121b through the second side 103 of bag 100f, a first row of perforations 122 extending from the first end 121a of the cut 121 across the second side 103, front wall 108, first side 102 and rear wall 104 of bag 100f, a second row of perforations 123 extending from the second end 121b of the cut 121 across the second side 103, front wall 108, first side 102 and rear wall 104 of bag 100f, an optional third row of perforations 124 connecting the end of the first row of perforations 122 and the second row of perforations 123, and a pull tape 127 covering the cut 121 and a small portion of the first row of perforations 122 and second row of perforations 123.

Referring to FIG. 12, a planar view of another embodiment of a substantially flat sheet of material from which a bag 100g is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the second side 103 of the bag 100g and comprises a full cut 121 in a carat shape having a first end 121a and a second end 121b through the second side 103 of bag 100g, a first row of perforations 122 extending from the first end 121a of the cut 121 across the second side 103, front wall 108 and into the first side 102 of bag 100g, a second row of perforations 123 extending from the second end 121b of the cut 121 across the second side 103, front wall 108 and into the first side 102 of bag 100g, an optional third row of perforations 124 connecting the end of the first row of perforations 122 and the second row of perforations 123, and a pull tape 127 covering the cut 121 and a small portion of the first row of perforations 122 and second row of perforations 123.

Referring to FIG. 13, a planar view of another embodiment of a substantially flat sheet of material from which a bag 100h is to be formed is shown. Shown on the sheet are front wall 108, rear wall 106, first side 102 having gusset portion 114a, second side 103 having gusset portion 114b, seam 104, top end 105 and bottom end 110. Also shown is easy open feature 120, which in this embodiment is near the top end 105 of the front wall 108 of the bag 100h and comprises a bidirectional full cut 121 in a square shape having a first end 121a, a second end 121b, a third end 121c and a fourth end 121d through the front wall 108 of bag 100h, a first row of perforations 122 extending from the first end 121a of the cut 121 across the front wall 108 and into the first side 102 of bag 100h, a second row of perforations 123 extending from the second end 121b of the cut 121 across the front wall 108 and into the first side 102 of bag 100h, an optional third row of perforations 124 connecting the end of the first row of perforations 122 and the second row of perforations 123, a fourth row of perforations 122a extending from the third end 121c of the cut 121 across the front wall 108 and into the second side 103 of bag 100h, a fifth row of perforations 123a extending from the fourth end 121d of the cut 121 across the front wall 108 and into the second side 103 of bag 100h, an optional sixth row of perforations 124a connecting the end of the fourth row of perforations 122a and the fifth row of perforations 123a, and a pull tape 127 covering the cut 121 and a small portion of the first row of perforations 122, second row of perforations 123, fourth row of perforations 122a and fifth row of perforations 123a.

Referring to FIG. 14, the back side view of yet another embodiment of a pinch cut bag 100j is shown. As shown in FIG. 14, the bag 100j has a first end 105 and a second end 110. It is useful to think of first and second ends 105 and 110 as the top and bottom ends of the bag 100j, respectively. The bag 100j has a front wall or surface 108, a rear wall or surface 106, and two side walls 102 and 103. The bag 100j also has a seam 104 on the back side, or rear wall or surface. The seam 104 is made when the bag 100 is formed using conventional methods known to those skilled in the art.

Using such conventional methods, a material from which a bag 100*j* is to be formed (such materials are discussed in detail below) is provided in a substantially flat sheet (see FIG. 8 through FIG. 13). The sheet is then directed and formed so that a portion of one side of the sheet is disposed on top of the other side of the sheet, such as in forming a tube. The overlapping portion is then secured and sealed together, forming the seam 104. Those skilled in the art will appreciate that conventional techniques can be used to provide side gussets in the bag 100*j* for each of sides 102 and 103 during this forming process.

The bottom (as shown in FIG. 14) of the first end 105 of bag 100*j* has portions 112*a* and 112*b* of the front wall 108 or surface of the bag that extend further from the body of the bag 100*j* than do portions 114*a* and 114*b* of the material of bag 100*j* forming the side gussets for sides 102 and 103. In addition, the portions 114*a* and 114*b* of the side gussets extend further from the body of the bag 100*j* than the top end 117 of the rear wall 106 of the bag 100*j*. As shown in FIG. 14, the rear wall of the bag 100*j* has a top end 117 that does not extend as far from the body of the bag 100*j* as the end portions 114*a* and 114*b* of the side gussets or the end portions 112*a* and 112*b* of the front wall 108 of the bag 100*j*.

Now referring to FIG. 15, a top side view of bag 100*k* is provided. For ease of reference, the same numerals are used in the Figures to denote the same features of bag 100*k*. As shown in FIG. 15, the bag 100*k* comprises multiple layers of materials 220, 222 and 224. The first layer 220 is preferably a woven polymeric material, such as polypropylene, polyester, high-density polyethylene, or polyethylene. The woven plastic layer 220 can be made of woven strips of plastic made of film to provide great strength from relatively lightweight materials, and can also be stretched to provide greater strength. For example, cross-laminated, woven plastic film strips, like XF films, are useful and are commercially available from Valeron. Similarly, a biaxially oriented polypropylene plastic material is commercially available from the AmTopp Division of Inteplast Group, Ltd. Those skilled in the art will appreciate that other materials, including various blends of polypropylene and polyethylene can be used without departing from the scope of the invention.

Still referring to FIG. 15, the layer 222 is a coating or a lamination, preferably a polypropylene film. Layer 224 is preferably an oriented polypropylene film with reverse printing. The layer 224 can comprise reverse printing of various labels, advertising, warnings, and other information as may be desired, such as the cover 130 shown in FIG. 15. Although not shown, those skilled in the art will appreciated that the top side, back side, and sides 102 and 103 of the bag 100 may all contain such pictures, patterns, or information as may be desired. Those skilled in the art will appreciate that the reverse printing of layer 224 can be achieved with conventional techniques, and with various conventional plastic films. An advantage of printing the bottom portion of the front and/or back panels is the provision of information that remains visible when the bag is on a display shelf in a store.

Still referring to FIG. 15, the bottom side (as shown in FIG. 15) of the bag 100*k* extends outward from the body of the bag 100*k* at the second end 110 of the bag 100*k*. As shown in FIG. 15, the top side of the bag 100*k* has an end portion 140 extending along the width of the bag 100*k*. The side gussets of the sides 102 and 103 of the bag 100*k* each have portions 142*a* and 142*b* which extend further towards the second end 110 of the bag 100*k* than the end portion 140 of the top side of bag 100*k*. In addition, the bottom side of the bag 100*k* has an end portion 110 that extends further from the end portions 142*a* and 142*b* of the side gussets. The end portion 110 of the bag 100*k* includes portions 144*a* and 144*b*. As shown in FIG. 15, the second end portion of the bottom side of the bag 100*k* extends along the entire width of the bag 100*k*. Also shown is seam 104.

Still referring to FIG. 15, the exposed end portions 144*a* and 144*b* of the bottom side of the bag 100*k* can be coated with a durable adhesive. The adhesive can be applied to selective surface areas, such as portions 144*a* and 144*b*, or can be applied in a line extending across the bottom side of the bag 100*k* along the second end portion 110, including portions 144*a* and 144*b*. After the adhesive is applied, preferably the sides 102 and 103 of the bag 100, together with the bottom side of the bag 100*k* are folded so that at least a portion of the interior surface of the bottom side of the bag 100*k* extends over the top surface of the top side of the bag 100*k*. Preferably, the portions 142*a* and 142*b* of the side gussets will be folded over and attached to the top surface of the top side of the bag 100*k*, as well as portions 144*a* and 144*b* of the second end 110 of the bottom side of the bag 100*k*. The coating then seals the second end 110 of the bag 100*k* together. The first end 105 of the bag 100*k* can be sealed in a similar fashion if desired. Alternatively, the first end 105 or second end 110 of the bag 100*k* can be sealed using a hot melt technique or any other technique well-known to those skilled in the art. Those skilled in the art will appreciate that a variety of different adhesives, including hot melt adhesives, can be used.

Referring now to FIG. 16, a detailed cross-sectional view of an end portion of the bag 100 is provided. As shown in FIG. 16, at least a portion of the front side 130 of bag 100 is now covered by the lowest edge portion 110 of the back side of bag 100, the extending portions 142*a*, 142*b* of side 102 of the bag 100, as well as a portion of the front side 130 of bag 100 including end portion 140. Once these portions are folded over, heat and pressure can be applied as appropriate to obtain and ensure that the bottom end 110 of bag 100 is durably sealed, such as with a conventional heat sealable adhesive.

Once the bag 100 is sealed at one end, it can be filled with the desired materials. It has been found that a bag 100 with a height of 41 inches and a width of 28 inches can durably hold at least about fifty (50) pounds of material without showing undue stress, tearing, breakage or the like. It is believed that any bulk material can be contained by bag 100, and the contents can weigh up to 100 pounds or so without undue risk of tearing or damage to bag 100. Once the bag 100 is filled, the second end typically needs to be sealed. The second end of the bag 100 can be sealed in a similar manner as that described above for the bottom end 110. Alternatively, the bag 100 can have its second end sealed by conventional means such as sewing. Still another approach is to seal the second end in a manner like that described for the bottom end 110 of the bag 100, and then stitching one of the two ends (not shown). Although not shown, those skilled in the art will understand and appreciate that a second end of bag 100 can be sealed with conventional techniques once bag 100 has been filled with the selected amount of the desired material.

Figure 17:
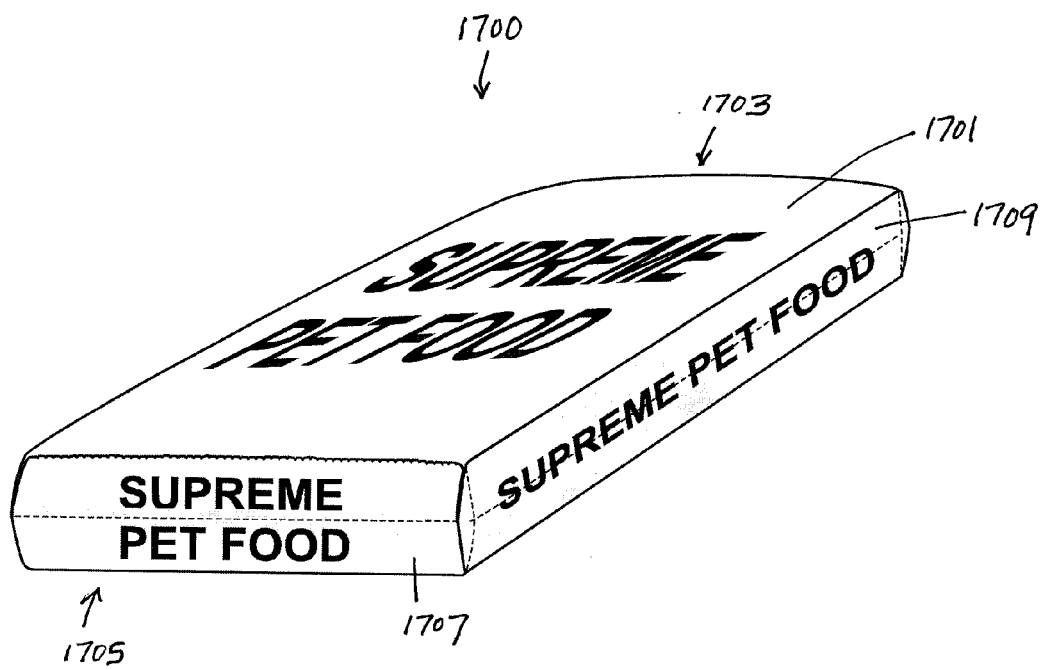
FIG. 17 shows an isometric view of a pinch cut bag according to one embodiment of the present disclosure.

Referring now to FIG. 17, an isometric view of bag 1700 is provided. As shown in FIG. 17, the bag 1700 includes a front panel 1701, a first side panel with gussets 1709, a second side panel with gussets (not visible in FIG. 17), a top end 1703, and a bottom end 1705. The bag 1700 is a pinch cut bag like those described previously, with both a pinch cut top end 1703 and a pinch cut bottom end 1705. The bag 1700 preferably has a weakened area (not shown in FIG. 17) or other easy open feature on at least one surface (not shown in FIG. 17). As shown in FIG. 17, the bag 1700 has been filled and contains one or more materials. Although the contents of the bag 1700 may be food, animal food, other bulk items, the contents may also contain liquids or mixtures. Those skilled in the art will appreciate that the bag 1700, once formed in accordance with the present disclosure, may be filled and then either the top end 1703 or the bottom end 1705 or both may be sealed as described previously. As shown in FIG. 17, the bag 1700, once filled, presents a bottom panel 1707 on the bottom end 1705 thereof and a top panel on the top end thereof (not visible in FIG. 17). The bag 1700 may be stacked on top of similar or different bags, such as at a grocery store, pet store, or other display location, such that panel 1707 is easily visible to a consumer. As shown in FIG. 17 the front panel 1701, the first side panel 1709 and the bottom panel 1707 includes printing (and can also include graphics), and it will be appreciated by the skilled artisan that the top panel, the rear panel, and the second side panel of bag 1700, which are not visible in FIG. 17, can also include graphics and/or printing. Thus bag 1700 has at least six discrete areas for printing and/or graphics, each formed by a discrete surface area of the bag 1700. Additionally, the printing and/or graphics can extend across more than one panel, or any combination of the six panels (not shown), or can be segmented across only a portion of one or more such areas to thereby provide additional discrete areas for graphics and/or printing. The panel 1707 may include graphics and/or printing so that a consumer is able to quickly, readily and easily identify the brand of the contents in the bag, such as the brand name for the pet food therein if the bag 1700 contains pet food. Alternatively, or in addition, the printing or graphics on the panel 1707 may contain information such as price, composition, expiration date, and the like. In another embodiment, the panel 1707 may contain printing or graphics that provide a coupon or other price discount or other offer, either on the contents of the bag 1700 or some other product. Those skilled in the art will appreciate that the discrete areas with graphics and/or printing may be limited to only one such discrete area, but could easily be six (or even more) discrete areas by using graphics and/or printing to separate one or more bag panels into two or more discrete areas (not shown).

Referring now to FIG. 18, a portion of the top end of a bag 1801 is shown. Bag 1801 in this embodiment is a LWS such as of the type previously described. Bag 1801 includes an easy open feature 1805 which extends across the width of the bag 1801. In this embodiment, the easy open feature 1805 is made of a material such as polyethylene, polypropylene, a mixture thereof, or some other polymer or co-polymer. Also in this embodiment, the bag 1801 at the top end is made of or alternatively can comprise in substantial the same polymer or co-polymer as the easy open feature 1805. In the bag 1801 shown in FIG. 18, the easy open feature 1805 is secured and sealed to the exterior surface of bag 1801. During manufacture, the easy open feature 1805 can be located by placing it relative to the top end of the bag 1801, then blowing hot air of a preselected temperature or within a preselected temperature range for a preselected time period. The selection of the temperature and time periods to obtain a seal may vary depending on the selection of the polymers for the feature 1805 and bag 1801, as well as on the nature of the seal desired. This technique allows at least sufficient portions of the inner surface of the easy open feature 1805 and the exterior surface of the bag 1801 to fuse or melt together and form a secure and stable seal. Those skilled in the art will appreciate and understand that alternative ways of applying heat and/or pressure to the easy open feature 1805 and the bag 1801 may be used to obtain a secure seal across the width of the top end of the bag 1801.

As also shown in FIG. 18, the feature 1805 includes two opposing flaps 1810 and 1812. These can be formed as part of the feature 1805 before the feature 1805 is secured to the bag 1801. Although not shown in FIG. 18, those skilled in the art will appreciate that the easy open or re-sealable feature 1805 can be provided with a flange located on the inner surface of flap 1812 and an opposing pair of flanges on the inner surface of flap 1810 (or vice versa) so that a user can easily push the single flange on flap 1812 into the groove between the pair of flanges on flap 1810 and create a seal and extend that seal across the width of the top end of the bag 1801, such as by pressing the two flaps 1810 and 1812 against one another. Alternatively, a user can pull the two flaps 1810 and 1812 apart and thus easily open the top end of the bag 1801.

Another alternative embodiment is shown in FIG. 19. In FIG. 19, the bag 1901 is shown with an easy open or re-sealable feature 1905 located at or near the top end of the bag 1901. As shown in FIG. 19, the feature 1905 extends across the entire width of the top end of the bag 1901. In this embodiment, the feature 1905 is made of a material such as polyethylene, polypropylene, a mixture thereof, or some other polymer or co-polymer and at least a portion of the exterior of the bag 1901 can be made of the same material as the feature 1905. The feature 1905 can be secured to the bag 1901 to create a seal as described above.

In FIG. 19, the feature 1905 includes a re-sealable feature which comprises a movable slider 1920 which, when moved by a user, either seals a combination of a flange and groove on opposable inner surfaces (not shown) of the feature 1905 or unseals the combination of the flange and groove. As shown in FIG. 19, a stop 1922 is provided at one end of the feature 1905. The stop 1922 helps prevent tearing of the top end of the feature 1905 and thus helps maintain the useful life of the bag 1901. The feature 1905 thus provides both an easy open feature and also a re-resalable feature in this particular embodiment.

Those skilled in the art will understand and appreciate that the bag according to the invention may vary in size, dimensions, and shape without departing from the scope of the invention, and that the foregoing description of the preferred embodiments is not intended to limit the scope of the invention, which is defined by the claims. For example, those skilled in the art will understand and appreciate that the foregoing bags can have sealed and sewn ends in a tubular bag with side gussets as shown, or a block bottom and top, or a combination thereof, although not shown. Those skilled in the art will also appreciate that a weakened portion or area can be provided in a number of ways that may vary from those expressly described and shown, such as by stressing portions of the bag wall with or without deforming, perforating, or cutting same, as well as varying the size, number, depth, and/or pattern of perforations, cuts, and/or deformations in a bag wall. Such features are conventional with prior art bags. Similarly, those skilled in the art will appreciate that terms such as "front" and "rear," and "top" and "bottom," are useful in describing a bag, but essentially depend on a bag's orientation when such terms are used, and are therefore not limiting as to a bag's orientation.

I claim:

1. A bag comprising a front wall, a back wall, an interior surface, an exterior surface, a top end, a bottom end, each of the front wall and back wall having an interior surface, an exterior surface, a top end and a bottom end, and each of the front wall and the back wall comprising a laminate, wherein the laminate comprises a first layer, second layer, and a third layer, wherein the first layer comprises woven polymer strips comprising oriented polypropylene, the second layer comprises a polymer film comprising oriented polypropylene, and the third layer comprises a polymer film comprising polypropylene, with the second layer laminated to the first layer by the third layer, and wherein the bag comprises an easy open feature located at or near either the top end or bottom end of the bag, and wherein at least a portion of the exterior surfaces of the top or bottom end of the front wall and the back wall comprises polypropylene and wherein at least a portion of the easy open feature comprises polyproylene, and wherein at least the portion of the easy open feature which comprises polypropylene and at least the portion of the exterior surfaces of the front wall and the back wall of the bag which comprises polypropylene form a seal which comprises a fused portion of the exterior surfaces, the easy open feature, or both.

2. The bag according to claim 1 wherein said seal extends the width of the bag.

3. The bag according to claim 2, wherein the easy open feature comprises a re-sealable feature having a sliding guide member.

4. The bag according to claim 1, wherein the first layer further comprises high density polyethylene, low density polyethylene, polyester, or any combination thereof.

5. The bag according to claim 1, wherein at least a portion of the second layer comprises a printed area thereon.

6. The bag according to claim 1, wherein the second layer further comprises polyethylene, polyethylene terephthalate, polyamide, or any combination thereof or paper.

7. The bag according to claim 1, wherein the second layer further comprises biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, coated paper or any combination thereof.

8. The bag according to claim 1, wherein at least a portion of a single fold of the bottom end of the front wall and the rear wall of the bag is sealed to the outer surface of the front wall of the bag.

9. The bag according to claim 8, wherein the bottom end of the bag is sealed using an adhesive sealing, heat sealing, adhesive lamination, extrusion lamination, stitching, ultrasonic energy, pressure, tape, or any combination thereof.

10. The bag according to claim 1, wherein at least a portion of a double fold of the bottom end of the front wall and the rear wall of the bag is sealed to the outer surface of the front wall of the bag.

11. The bag according to claim 1, wherein at least a portion of the bottom end of the rear wall projects further than the bottom end of the front wall.

12. The bag according to claim 11, wherein the portion of the bottom end of the rear wall that projects further than the bottom end of the front wall is sealed to the outer surface of the bottom end of the front wall.

13. The bag according to claim 1, wherein the bag further comprises a first side wall having an interior surface, an exterior surface, a top end and a bottom end, and a second side wall having an interior surface, an exterior surface, a top end and a bottom end, wherein the first side wall and the second side wall further comprise gussets.

14. The bag according to claim 13, wherein at least a portion of the bottom end of the rear wall projects further than the bottom end of the first side wall, the bottom end of the second side wall, and the bottom end of the front wall.

15. The bag according to claim 14, wherein the portion of the bottom end of the rear wall that projects further than the bottom end of the first side wall, the bottom end of the second side wall, and the bottom end of the front wall is sealed to the outer surface of the bottom end of the front wall.

16. The bag according to claim 13, wherein at least a portion of the bottom end of the rear wall projects further than the bottom end of the first side wall and the bottom end of the second side wall, and the bottom end of the first side wall and the bottom end of the second side wall project further than the bottom end of the front wall, and wherein the portion of the bottom end of the rear wall that projects further than the bottom end of the first side wall and the bottom end of the second side wall, and the portion of the bottom end of the first side wall and the bottom end of the second side wall that project further than the bottom end of the front wall are sealed to the outer surface of the bottom end of the front wall.

17. The bag according to claim 16, wherein at least a portion of the top end of the front wall projects further than the top end of the first side wall and the top end of the second side wall, and the top end of the first side wall and the top end of the second side wall project further than the top end of the rear wall.

18. The bag according to claim 1, wherein the top end and the bottom end of the bag are sealed, and wherein the bag comprises at least ten pounds by weight of a filling material.

19. The bag according to claim 1, wherein the third layer further comprises high density polyethylene, low density polyethylene, polyester, or any combination thereof.

20. The bag according to claim 1, wherein the third layer further comprises polyethylene, polyethylene terephthalate, polyamide, or any combination thereof.

21. The bag according to claim 1 wherein the bag comprises a pinch cut bag and wherein at least portions of the exterior surfaces of each of the front wall and the back wall comprise a plurality of discrete areas further comprising printing thereon.

22. The bag according to claim 1 wherein a portion of the front wall and a portion of the back wall combine to form a discrete portion of the bag located at or near either the top end or the bottom end, wherein the discrete portion of the bag comprises printing thereon.

23. The bag according to claim 22 wherein at least a portion of the front wall or the back wall projects beyond a corresponding portion of the other, thereby defining a pinch bottom bag at least the top end or the bottom end of the bag.

24. A bag comprising a front wall, a back wall, an interior surface, an exterior surface, a top end, a bottom end, each of the front wall and back wall having an interior surface, an exterior surface, a top end and a bottom end, and each of the front wall and back wall having a first layer, a second layer, and a third layer, wherein the first layer comprises woven polymer strips comprising polypropylene, the second layer comprises an oriented polymer film comprising polypropylene, and the third layer comprises a film comprising polypropylene, with the second layer attached to the first layer by the third layer, and wherein the bag comprises an easy access feature comprising a resealable feature located at or near either the top end or bottom end of the bag, wherein at least a portion of the exterior surfaces of the top or bottom end of the front wall and the back wall comprise polypropylene and wherein at least a portion of the easy access feature comprises polypropylene, and wherein the portion of the easy access feature which comprises polypropylene is sealed to the portion of the exterior surfaces of the top or bottom end of the front wall and the back wall of the bag without the use of an adhesive.

25. A bag comprising a front wall, a back wall, a first side wall, a second side wall, an interior surface, an exterior surface, a top end, a bottom end, the front wall, back wall, first side wall and second side wall each having an interior surface, an exterior surface, a top end and a bottom end, and comprising a laminate consisting essentially of a first layer, a second layer, a third layer, wherein the first layer comprises woven polymer strips comprising polypropylene, the second layer comprises a polymer film comprising polypropylene, and third layer comprises a film comprising polypropylene, wherein the second layer is laminated to the first layer by the third layer, and wherein the bag comprises an easy access feature comprising a resealable feature having a sliding guide member and at least two opposing flaps, wherein the easy access feature is located at the top end or bottom end of the bag, and wherein the easy access feature comprises polypropylene and at least a portion of a first of the opposing flaps is sealed to a portion of the exterior surface of the second layer of the front wall of the bag, and at least a portion of a second of the opposing flaps is sealed to a portion of the exterior surface of the second layer of the back wall of the bag, without the use of an adhesive.

26. A bag comprising a front wall, a back wall, an interior surface, an exterior surface, a first end, a second end, each of the front wall and back wall having an interior surface, an exterior surface, a top end and a bottom end, and each of the front wall and the back wall comprise a laminate, wherein the laminate comprises a first layer, a second layer, and a third layer, wherein the first layer comprises woven polymer strips comprising oriented polyethylene, the second layer comprises a polymer film comprising oriented polyethylene, and the third layer comprises a polymer film comprising polyethylene, with the second layer laminated to the first layer by the third layer, and wherein the bag comprises an easy open feature located at or near the first end of the bag, and wherein at least a portion of the exterior surfaces of the first end of the front wall and the back wall comprises polyethylene and wherein at least a portion of the easy open feature comprises polyethylene, and wherein at least the portion of the easy open feature which comprises polyethylene and at least the portion of the exterior surfaces of the front wall and the back wall of the bag which comprises polyethylene form a seal which comprises a fused portion of the exterior surfaces, the easy open feature, or both.

27. The bag according to claim 26 wherein the easy open feature comprises a re-sealable feature having a sliding guide member.

28. The bag according to claim 26 wherein said seal extends the width of the bag.

29. A bag comprising a front wall, a back wall, an interior surface, an exterior surface, a first end, a second end, each of the front wall and back wall having an interior surface, an exterior surface, a first end and a second end, and each of the front wall and back wall having at least a first layer and a second layer, wherein the first layer comprises woven polymer strips consisting essentially of polyethylene and the second layer comprises an oriented polymer film consisting essentially of polyethylene, wherein the second layer is attached to the first layer, and wherein the bag comprises an easy access feature comprising a resealable feature located at the first end of the bag, wherein at least a portion of the exterior surfaces of the first end of the front wall and the back wall consist essentially of polyethylene and wherein at least a portion of the easy access feature consists essentially of polyethylene, and wherein the portion of the easy access feature which consists essentially of polyethylene forms a seal with the portion of the exterior surfaces of the first end of the front wall and the back wall of the bag without the use of an adhesive.

30. The bag according to claim 29 wherein the easy open feature comprises a re-sealable feature having a sliding guide member.

31. The bag according to claim 29 wherein said seal extends the width of the bag.

* * * * *